J. J. SULLIVAN.
BLOTTER.
APPLICATION FILED AUG. 10, 1918.

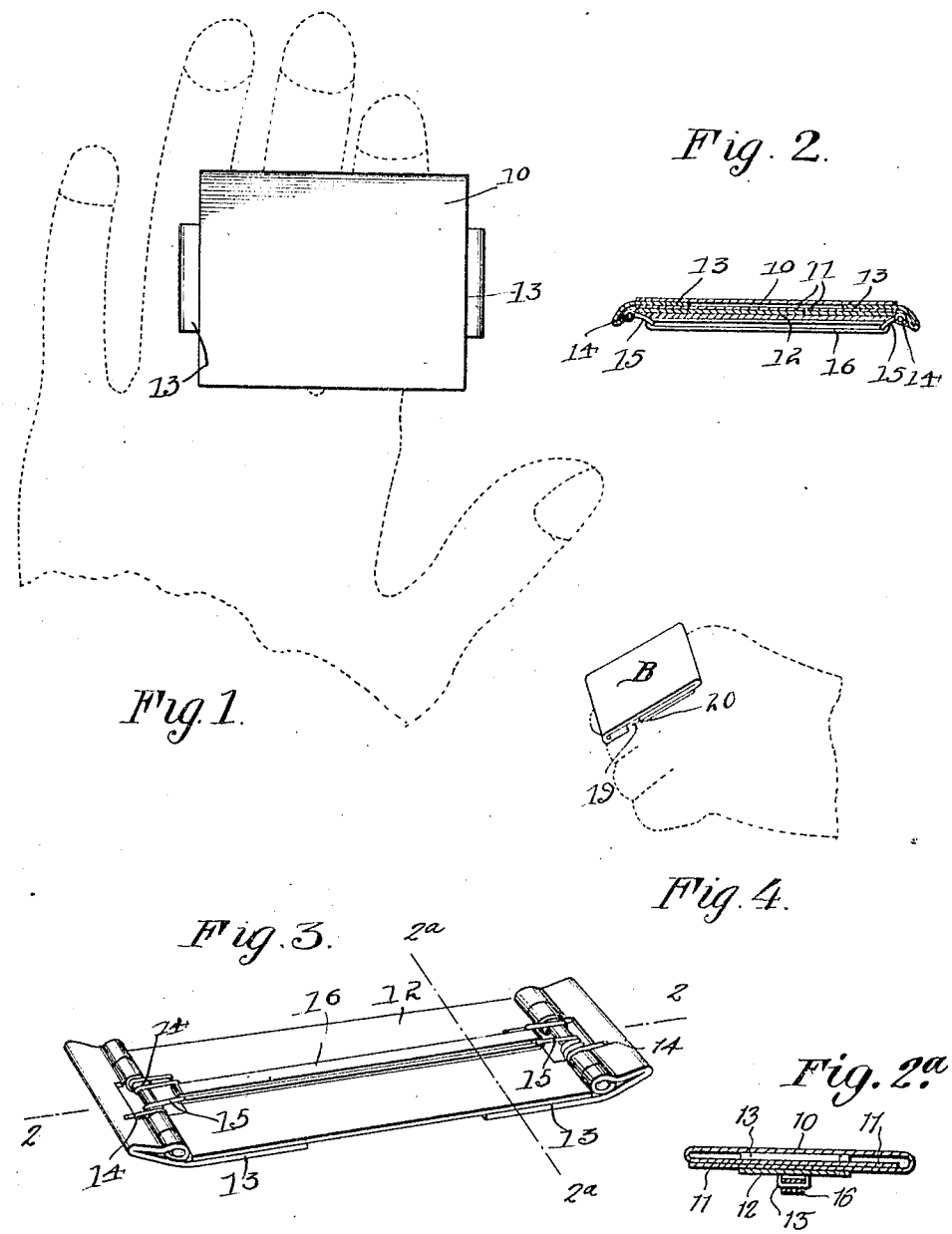

1,308,688.

Patented July 1, 1919.
2 SHEETS—SHEET 2.

Witnesses
R. A. Thomas

Inventor
James J. Sullivan
By Victor J. Evans
Attorney

UNITED STATES PATENT OFFICE.

JAMES J. SULLIVAN, OF ST. THOMAS, MINNESOTA.

BLOTTER.

1,308,688.  Specification of Letters Patent.  Patented July 1, 1919.

Application filed August 10, 1918. Serial No. 249,283.

*To all whom it may concern:*

Be it known that I, JAMES J. SULLIVAN, a citizen of the United States, residing at St. Thomas, in the county of Lesueur and State of Minnesota, have invented new and useful Improvements in Blotters, of which the following is a specification.

This invention relates to blotters and more especially to those which are attached to the hand, the object being to produce an extremely simple type of hand blotter, by means of which a constant worker with the pen, such as a bookkeeper, can readily blot his work while the ink is fresh and with a minimum of manual effort and which when in place on the hand does not interfere with the use of the fingers for other purposes.

This object is accomplished by constructing the blotter in the manner hereinafter more fully described and claimed and as shown in the accompanying drawings.

In the drawings:—

Figure 1 is a plan view of the preferred form of the invention shown applied, the fingers being dotted;

Fig. 2 is a sectional view taken on the line 2—2 of Fig. 3;

Figure 5:
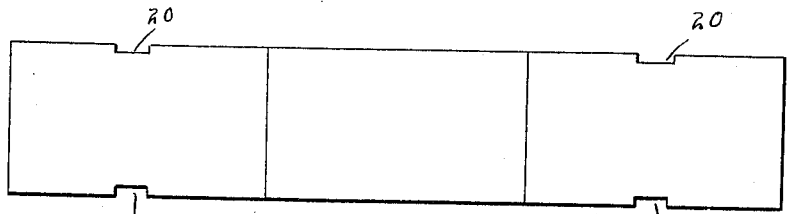
Figure 6:
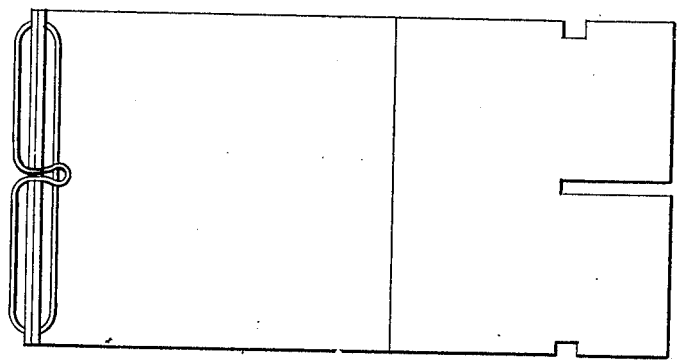
Figure 7:
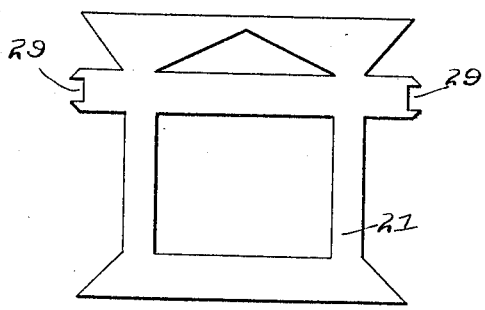
Figure 8:
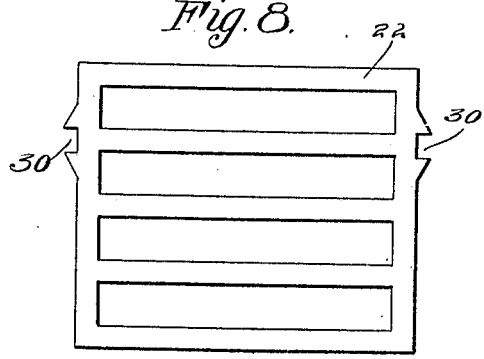

Fig. 2ª is a similar view on the line 2ª—2ª of Fig. 3;

Fig. 3 is a detail perspective view of the stiffening frame removed from the blotter;

Fig. 4 is a similar view of a modified form of the invention, the fingers to which it is attached being also shown in dotted lines;

Fig. 5 is a plan view of the blotter shown in Fig. 4, the said blotter being opened out to show the stiffener on the interior;

Fig. 6 is a plan view of a larger type of blotter, wherein one panel is opened out flat and the other panel stands on edge to show the rubber band strung therethrough;

Fig. 7 is a plan of one form of stiffening frame, which may be used in connection with the blotter shown in Figs. 4, 5 and 6; and Fig. 8 is a similar view of a still further modified form of stiffening frame.

Referring in detail to the drawings and especially to Figs. 1 to 3 inclusive, the blotter as shown is folded into three sections or panels and includes a central panel 10 and side panels or wings 11, the latter being folded over upon the central panel and connected together by various means. One of such means is illustrated in the preferred embodiment of the invention and includes a stiffening frame 12 which may be removably clamped to the side panels or wings 11 so as to hold the blotter in its folded position. The stiffening frame 12 comprises a relatively narrow elongated strip of metal, having hingedly secured at each end thereof wings 13, the latter being folded substantially flat at approximately their central transverse points, so that a portion of the wings extend outwardly to form a continuation of the metal strip and the other folded portions of the wings extend inwardly to engage under the metal strip and form a clamp for the reception of the folded end panels or wings 11 of the blotter. The wings are normally retained in clamping position, through the medium of springs 14, whose central portions are formed into loops 15, through which is threaded a flexible band 16, formed of rubber or the like. If desired a different form of spring may be substituted for the one shown and described.

In the use of the blotter the fingers of the left hand are positioned within the loop formed by the flexible band 16, with the blotter across the back of the fingers of the left hand. This leaves the fingers free for other uses, while the blotter is at all times in a handy position for use.

In Figs. 4 and 5 there is illustrated a modified form of the invention, which is of simpler construction and consists of a blotter B which may be applied to the back of the index finger, while the form shown in Fig. 1 is adapted to be carried on the back of the first and second fingers of the left hand. The forms shown in Figs. 5 and 6 each comprise a strip of blotting paper C, which is stiffened by a card board strip D laid on the upper or inactive side of the blotting paper strip and a rubber band 19 for holding the two strips together and for holding the entire device on the hand. It is of course obvious that the blotter is bent to form the central panel and end panels described in connection with the preferred form of the invention, the side panels being folded over the central panel and provided with notches 20, both in the blotting strip and the stiffening strip. In folding the device, the end panels are folded over upon the central panel, the rubber band inclosing the two end panels and positioned within the notches. The device is applied to the hand in the same manner as described in connection with the preferred form of the invention, except that the blotter is carried, as before stated, upon the index finger of the left hand.

In the form of the invention shown in Fig. 6, the strips of blotting paper and the stiffener strip are wider and perhaps a little longer, although they are folded into the three panels as previously described. The side notches are used and a rubber band of somewhat larger size is engaged within the notches. In addition there are provided slots in the extremities of the side panels and after folding these panels over upon one another, the rubber band is strung through the side notches and the intervening slots, in substantially 3-shape, so that it leaves two loops exposed on the rear or inactive side of the blotter. These two loops are adapted to receive the first two fingers of the left hand, with the blotter positioned upon the back of these fingers as in the forms previously described.

In Figs. 7 and 8 there are illustrated two forms of stiffening frames, such as may be employed in connection with the form of the invention shown in Figs. 4, 5 and 6. This frame is indicated at 21 in Fig. 7 and 22 in Fig. 8. In both forms, there are provided notches 29 and 30, respectively, for the reception of the flexible bands.

The invention is susceptible of various changes in its form, proportions and minor details of construction and the right is reserved to make such changes.

Having described the invention, what is claimed is:—

1. The herein described hand attached blotter comprising a strip of blotting paper folded into an intermediate panel and two overlapping side panels, a stiffening frame, means located at each end of the stiffening frame for gripping the folded panels and a flexible band positioned across the blotter for engagement around the operator's fingers.

2. The herein described hand attached blotter comprising a strip of blotting paper folded into an intermediate panel and two overlapping side panels, a stiffening frame extending across the folded panels, spring controlled wings located at each end of said frame for insertion between said panels and a flexible band positioned across the blotter for engagement around the operator's fingers.

3. The herein described hand attached blotter comprising a strip of blotting paper folded into an intermediate panel, two overlapping side panels, a flexible stiffening frame, hinged gripping members carried by the stiffening frame and engageable with the folded panels and a flexible band positioned across the blotter for engagement around the operator's fingers.

In testimony whereof I affix my signature.

JAMES J. SULLIVAN.

Copies of this patent may be obtained for five cents each, by addressing the "Commissioner of Patents, Washington, D. C."